ial
3,181,167
SIGNAL RECORDING SYSTEM
Ralph W. Mann, Bellaire, Tex., assignor, by mesne assignments, to Jersey Production Research Company, Tulsa, Okla., a corporation of Delaware
Filed June 3, 1960, Ser. No. 33,698
2 Claims. (Cl. 346—74)

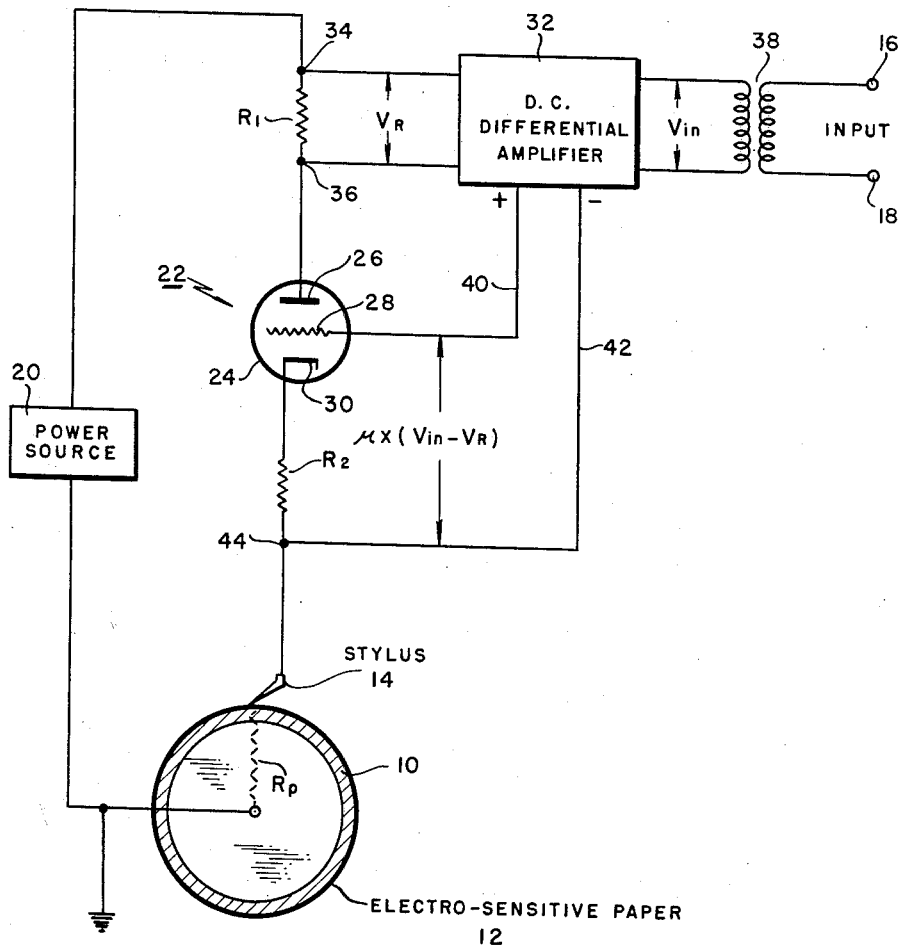

This invention relates to the recording of signals on an electrosensitive record medium. More particularly, this invention is an improved electrical circuit for blackening the electrosensitive record medium an amount proportional to an input signal.

One method of obtaining a permanent record of the magnitude with respect to time of input signals is to record these input signals on electrosensitive paper. The electrosensitive paper includes chemicals thereon which become active to obtain a blackening effect when an electric current is passed through the paper.

In the past, it has been assumed that the blackening is proportional to the voltage applied to the styli. However, I have found that in practice the electrosensitive paper does not become blackened an amount proportional to the voltage. This is so because the resistance of the paper at various locations on the paper varies widely. If an input signal of a particular voltage is applied at one point on the electrosensitive paper, a certain blackening effect will occur. However, if the same input voltage is applied at another point on the electrosensitive paper, say at a point of much greater resistance than the first point, the blackening effect will be much less than the blackening effect at the first point.

When current if fed through the electrosensitive paper, the electrochemical reaction causes the decomposition of certain materials to obtain the black deposit. I have found that the black deposit is proportional to the current flowing through the electrosensitive paper rather than proportional to the voltage causing that current. Hence, it is much more important to send a current through the electrosensitive paper which is proportional to the input voltage rather than to apply a voltage which is proportional to the input voltage.

My new circuit for recording input signals on an electrosensitive record medium includes an electrical circuit with the resistance of the electrosensitive record medium forming a part of the electrical circuit. The blackening effect is proportional to the input voltage because of the flow of a current through the electrosensitive paper which is proportional to the input voltage. The circuit is constructed in a manner such that if the resistance of the electrosensitive paper should vary, the current is automatically adjusted to be proportional to the input signal.

Briefly described, the new system includes a source of voltage. A fixed resistance member and a variable impedance are connected across the source of voltage. The electrosensitive record medium also forms a part of the circuit. A differential amplifier is included at part of the system. The amplifier has one input electrically coupled to the input signal and a second input connected across at least a portion of the fixed resistance.

The output of the differential amplifier is coupled to the variable impedance circuit. The phase and magnitude of the output signal from the differential amplifier is such as to adjust the impedance of the variable impedance member to cause a current to be fed through the electrosensitive record which is proportional to the input signal. Any change in resistance within the electrosensitive record medium causes a change in current through the fixed resistance. This change in current causes a change in voltage drop across the fixed resistance. Hence, the voltage drop across the fixed resistance is compared with the input signal by the differential amplifier. The change in current caused by a change in resistance in the electrosensitive paper effects the output signal from the differential amplifier which is fed to the variable impedance.

The invention as well as its many advantages will be further understood by reference to the following detailed description and signal drawing which shows schematically my new system for forming on an electrosensitive record medium a permanent record of input signals.

Referring to the drawing, a rotatable drum 10 is shown about which is mounted the electrosensitive paper 12. The electrosensitive paper 12 has chemicals therein which form black deposits which I have found are proportional to the current through the electrosensitive paper.

A stylus 14 is used to conduct the current to the electrosensitive paper 12 as the drum is rotated. It is desired to effect a blackening effect upon the electrosensitive paper 12 which is proportional to an input signal which is fed across the input terminals 16 and 18.

A power source 20 applies a voltage across a series arrangement of a resistor $R_1$, a variable impedance circuit indicated generally by the numeral 22, and the resistance of the electrosensitive paper 12 indicated by the broken line and identified as $R_p$.

The variable impedance circuit includes a triode tube 24 having a plate 26, a grid 28, and a cathode 30. A resistor $R_2$ is included in the cathode circuit.

The triode tube 24 with the resistor $R_2$ is one of the simpler ways of providing a variable impedance circuit in the system. However, it is to be understood that various other arrangements may be used for causing a variable impedance.

A D.C. differential amplifier 32 is included as a part of my new system. The differential amplifier 32 is connected to the main circuit across the resistor $R_1$, as at junctions 34 and 36. Thus, the voltage across the resistor $R_1$ is applied as one input to the D.C. differential amplifier 32.

The other input to the differential D.C. amplifier 32 is obtained from the input signal which is applied across terminals 16 and 18 and transformer 38 to the input $V_{in}$. The output from the D.C. differential amplifier 32 is fed across lines 40 and 42 to the grid 28 of the triode 24 and the junction 44 in the cathode circuit of the tube, respectively. The phase and magnitude of the output signal from differential amplifier 32 is such as to adjust the impedance of the variable impedance circuit 22 to cause a current to be fed through the electrosensitive paper 12 which is proportional to the input signal applied across terminals 16 and 18.

In operation, the voltage input $V_{in}$ is compared with the voltage $V_R$ across the resistance $R_1$. With higher input voltages, the voltage output applied across the grid 28 of tube 24 and junction 44 is increased to decrease the impedance in the variable impedance 22. The decreased impedance across the variable impedance circuit 22 causes a larger current to pass through the electrosensitive paper 12. If the input $V_{in}$ decreases, a lower voltage is applied across the grid 28 of tube 24 and junction 44 causing the impedance across the variable impedance 22 to be increased with a resulting decrease in current in the paper 12.

Notice also the important feature of my invention that a change in resistance $R_p$ of the electrosensitive paper 12, say an increase in resistance, will tend to effect a decrease in the current through the circuit including power source 20, resistor $R_1$, variable impedance 22, and the resistance, $R_p$, of the electrosensitive paper 12. The lower current across resistor $R_1$ decreases the potential drop across said resistor. This, of course, causes a greater voltage to be applied from the output of the D.C. differential amplifier 32 to the grid of tube 24 effecting a proportionality of writing current to input voltage. Similarly, a decrease in resistance of the electrosensitive paper 12 will tend to cause an increase in current, an increase in the potential drop across resistor $R_1$, and a lower voltage applied to the grid 28 of tube 24. From the foregoing it is seen that even though the resistance of the electrosensitive paper 12 varies, my new system corrects for this change in resistance and causes the current in the electrosensitive paper 12 to be proportional to the input voltage across terminals 16 and 18.

I claim:

1. In combination: an electric circuit comprising a source of voltage, a fixed resistance member, a variable impedance, an electrosensitive record medium upon which a darkening effect proportional to an input signal is to be effected and recording means for causing the darkening effect; and a differential amplifier having one input electrically coupled to said input signal, a second input connected across at least a portion of said fixed resistance member, and an output coupled to said variable impedance member, the phase and magnitude of the output signal from the differential amplifier being such as to adjust the impedance of said variable impedance to cause a current to be fed through said electrosensitive record medium which is proportional to said input signal.

2. The combination of claim 1 wherein the resistance member, variable impedance, and electrosensitive record medium are arranged in series across the source of voltage.

References Cited by the Examiner

UNITED STATES PATENTS

| | | | |
|---|---|---|---|
| 2,775,756 | 12/56 | Bracey et al. | 346—74 |
| 2,926,057 | 2/60 | Horsch | 346—74 |
| 2,987,367 | 6/61 | Farber | 346—74 |

IRVING L. SRAGOW, *Primary Examiner.*

ROBERT H. ROSE, ROBERT SEGAL, *Examiners.*